United States Patent [19]
Meggitt et al.

[11] Patent Number: 5,440,329
[45] Date of Patent: Aug. 8, 1995

[54] SYSTEMS AND METHODS FOR THERMAL TRANSFER PRINTING

[75] Inventors: Adam E. Meggitt, Beaverton; Thomas J. Brandt, Canby; Stephen A. Zimmerman, Wilsonville, all of Oreg.

[73] Assignee: Tektronix, Inc., Wilsonville, Oreg.

[21] Appl. No.: 994,803

[22] Filed: Dec. 22, 1992

Related U.S. Application Data

[63] Continuation-in-part of Ser. No. 962,367, Oct. 16, 1992, which is a continuation-in-part of Ser. No. 930,572, Aug. 17, 1992, which is a continuation-in-part of Ser. No. 762,537, Sep. 18, 1991, abandoned.

[51] Int. Cl.⁶ .............................................. B41J 2/325
[52] U.S. Cl. .................................................... 347/212
[58] Field of Search ................ 346/76 PH, 1.1, 76 R; 400/120

[56] References Cited

U.S. PATENT DOCUMENTS

| | | | |
|---|---|---|---|
| 4,527,171 | 7/1985 | Takanashi et al. | 346/76 PH |
| 4,670,307 | 6/1987 | Onishi et al. | 427/261 |
| 4,704,415 | 11/1987 | Tanaka | 346/76 PH |

Primary Examiner—Huan H. Tran
Attorney, Agent, or Firm—Ralph D'Alessandro; John D. Winkelman

[57] ABSTRACT

A system and method for printing a predetermined image onto a substrate includes steps or structure for obtaining pixel data which renders a portion of the predetermined image and relates to whether a colorant is to be deposited in a predetermined area comprising at least one subject pixel and at least one adjacent pixel; determining whether a colorant is specified for any of the predetermined area; and depositing an image-enhancing coating over the subject pixel on the substrate if the above determining step determines that a colorant is so specified, whereby a portion of the image-enhancing coating receiving area is successively determined "on-the-fly" using a minimal physical memory space without sacrificing the system performance. A second aspect of the disclosure involves an efficient method and structure for converting a pixel data relating to the deposition of the image-enhancing coating material format into a compact data format which is acceptable by a printer.

29 Claims, 15 Drawing Sheets

00000010000100000000000011111111100000

0000000100001000000000000111111110000

111100000000000000000001111111100000000011

111100000000000000000000000000001111

00000111111111110000000000000111111110000

00000001000010000000000000111111100000

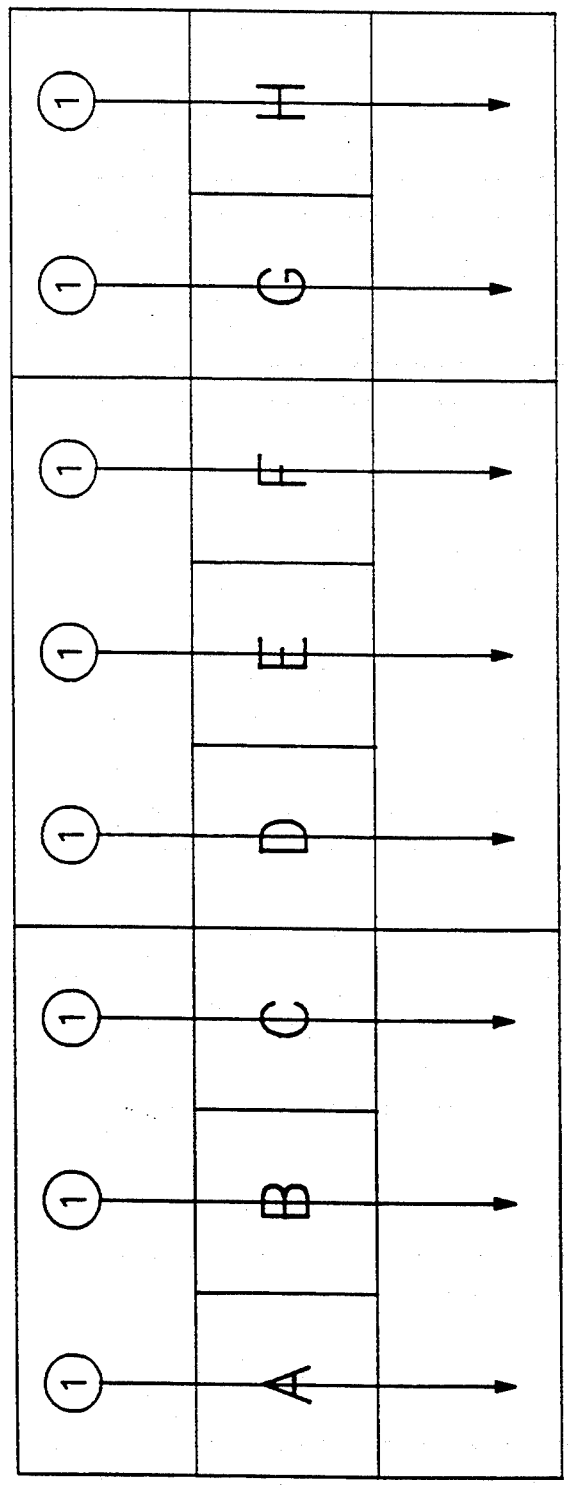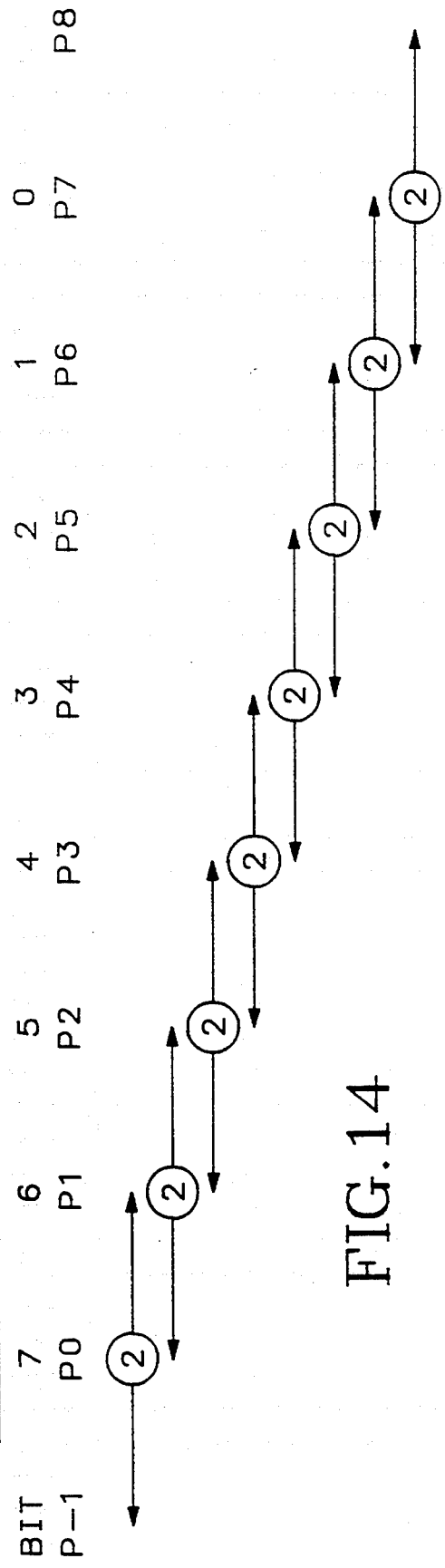
FIG.14

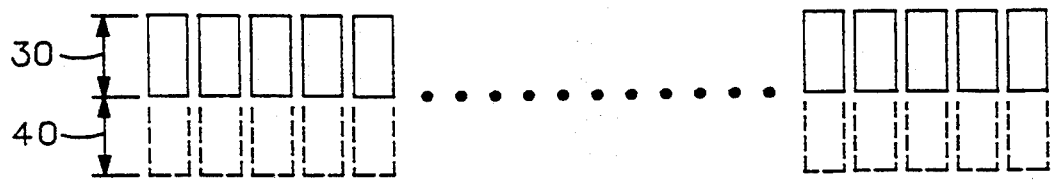
FIG. 16
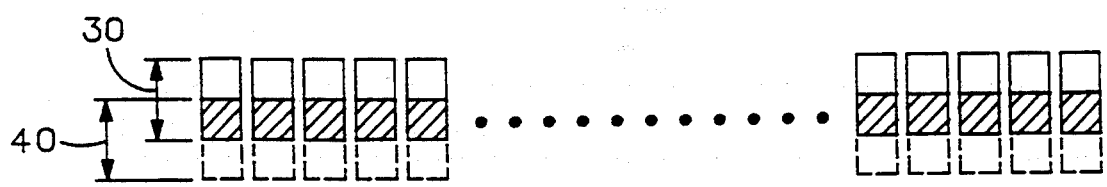
FIG. 17A
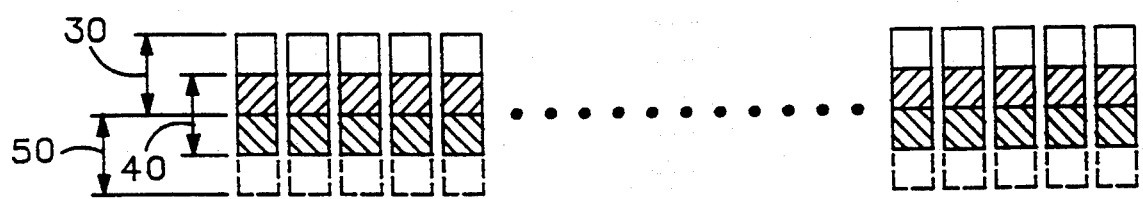
FIG. 17B
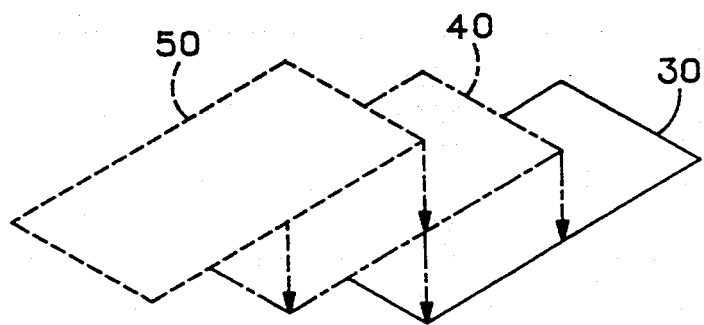

SYSTEMS AND METHODS FOR THERMAL TRANSFER PRINTING

CROSS-REFERENCE TO RELATED APPLICATIONS

This is a continuation-in-part of application Ser. No. 07/962,367, filed Oct. 16, 1992, which in turn is a continuation-in-part of Ser. No. 07/930,572, filed Aug. 17, 1992, which in turn is a Continuation-in-part of Ser. No. 07/762,537, filed Sep. 18, 1991, now abandoned. The disclosures of the above-referenced documents are hereby incorporated as if set forth fully herein.

BACKGROUND OF THE INVENTION

1. Field of the Invention

This invention relates to improved methods of monochromatic and color printing on various types of substrate surfaces. More specifically, this invention relates to systems and methods for determining where to apply an image-enhancing coat to a substrate in a thermal transfer printing (e.g., thermal wax transfer, dye diffusion transfer or the like) process.

2. Description of the Prior Art

Thermal transfer printing, as defined herein, includes the known printing methods of thermal wax transfer printing, thermal dye diffusion printing, and the like.

Thermal wax transfer printing involves the transfer of a colorant, which is dispersed in a wax base material, from a carrier onto a substrate surface such as smooth paper in a controlled manner to generate an image. A thermal transfer print engine having a large number of independently activatable heating elements per unit of length is one apparatus that has been employed for this purpose. The carrier is most often placed within the print engine such that one side of the carrier is adjacent to the heating elements and a second, opposite side bearing the wax base material is positioned adjacent to the substrate surface upon which printing is intended.

To accomplish image generation, the print engine and substrate are moved relative to each other. If a color is intended to be deposited at a location on the substrate surface with which the printhead is aligned, the appropriate heating element is activated, and the carrier is locally heated to a temperature at or above the melting point of the colorant. When this happens, an amount of the wax-based ink in the colorant softens and adheres to the substrate at the desired location, breaking away from the carrier and the unheated or insufficiently heated colorant. In generating a subtractive color image, three (cyan, magenta and yellow) or four (cyan, magenta, yellow and black) sequential passes are made over the same substrate with different carriers, each of which is dedicated to one of the primary colors.

Dye diffusion printing involves the transfer of a dye colorant from a carrier, such as a polymer ribbon, onto a specialized substrate surface, such as a polyester sheet, in a controlled manner to generate an image. A thermal transfer print engine and three different color dye/carrier structures may also be employed in this type of image generation, utilizing similar heat-induced, subtractive color printing techniques. The operating principles for dye diffusion are different from those of thermal wax transfer printing, however. In dye diffusion applications, the amount of dye deposited at a single location can be varied, so that more subtle color gradations are achievable. Images of near photo quality have been produced using dye diffusion technology.

If a color is to be deposited at a location on the substrate surface with which the printhead of the thermal transfer print engine is aligned, the appropriate heating element is activated, and the dye/carrier structure is heated to a temperature sufficient to cause migration of an appropriate amount of dye, thereby releasing the dye from the carrier in the vicinity of the specially structured substrate. In this manner, the appropriate amount of dye contacts and penetrates the substrate through molecular dispersion of the dye in the substrate at the desired location.

Many types of paper, particularly the bond-type paper which is popular in the United States, exhibit a rough surface, featuring plateaus and voids. Conventional prior art thermal transfer printing techniques cannot be effectively used with such paper, because the voids in the paper substrate surface structure cause adherence problems or broken ink or dye dots.

Also, most paper is not chemically compatible with diffusion dyes in a manner to provide a solid-in-solid dye-substrate solution. As a result, bright colored images cannot be generated on such substrates using dye diffusion technology. Since "plain paper" exhibiting a rough surface is less costly than specialized substrate materials, and high quality images are obtainable using thermal transfer techniques, methods of color printing on plain paper substrates are desirable.

It has recently been suggested to deposit a precoat onto the substrate surface which is smoother and more chemically compatible with the intended colorant than the substrate surface is. U.S. Pat. Nos. 4,527,171 issued to Takanashi et al., 4,670,307 issued to Onishi et al. and 4,704,615 issued to Tanaka are examples of thermal transfer printing systems which utilize a fusible binder material that is deposited as a precoating onto the substrate prior to printing.

Takanashi et al. coat the entire substrate upon which printing is intended with a layer of the binder material. This method effectively prepares the substrate for deposition of colorant during printing, but consumes a large amount of the binder which is used during the precoating process. In addition, it results in a discernable smoothening of the surface of the substrate, which may be objectionable to those who prefer the look and feel of plain paper.

In Tanaka, the precoating is applied to the substrate on a pixel by pixel basis, to the same pixel locations as where the deposition of colorant is intended. The precoating is applied to a slightly broader area at each pixel location than the colorant, as a result of a longer pulse width being applied to the printhead element during deposition of the precoat material. While the Tanaka system preserves the look and feel of plain paper for that portion of the substrate which had not been printed on, certain problems still exist. Specifically, it has been found that, in some instances, it is difficult to effectively apply the precoating to the substrate in discrete one pixel intervals. Such problems are most common in areas where the desired image requires that the colorant be applied only very sparsely to the substrate. In such areas, it appears that the combined effect of heat loss from a single activated heating element on the printhead and the transitional period needed to bring the heating element to its operational temperature result, at times, in a less than satisfactory deposition of the precoat material to the substrate.

Another difficulty arises in determining the precise area or pixel locations in which coating is to be applied. As a result of the high resolution that is provided by modern printers, the amount of memory that is required to store image information can be relatively large. In order to avoid excessive use of memory and the resulting time constraints, it is desirable that the location of the coating be determined in as memory-efficient a manner as possible.

It is clear that there has existed a long and unfilled need in the prior art for an improved system and method for making printed products which overcomes the disadvantages discussed above.

SUMMARY OF THE INVENTION

Accordingly, it is an object of the invention to provide a system and method for thermal mass transfer printing which is capable of producing a high-quality image on a substrate without materially changing the texture or appearance of the substrate.

It is an object of one aspect of the invention to provide a system and method for determining an area in which to apply an image-enhancing coating in a thermal transfer printing process which will require a minimal amount of physical memory space without sacrificing performance.

The invention also embraces systems for performing the above-described methods.

To achieve the above and other objects of the invention, a method of printing a predetermined image on to a substrate may include the steps of obtaining pixel data relating to whether a colorant is to be deposited in a predetermined area which comprises at least one subject pixel and at least one adjacent pixel and renders a portion of the predetermined image; determining whether a colorant is specified for any of the predetermined area; and depositing an image-enhancing coating over the subject pixel on the substrate if the above determining step determines that the colorant is so specified.

A method of rendering a predetermined image on a substrate according to a second aspect of the invention may include the steps of obtaining pixel data in a first format which represents a plurality of color planes for a subject pixel and a predetermined number of surrounding pixels, the pixels being arranged in rows and columns, the pixels rendering a portion of the predetermined image; determining if any of the row pixels specifies a colorant by ORing the row pixels; determining if any column of the ORed pixels specifies a colorant by further ORing the ORed pixels; and depositing an image-enhancing coating onto the subject pixel on the substrate based upon the second determining step.

A system for printing a predetermined image on to a substrate according to a third aspect of the invention may include a structure for obtaining pixel data relating to whether a colorant is to be deposited in a predetermined area comprising at least one subject pixel and at least one adjacent pixel, the predetermined area rendering a portion of the image; a first structure for determining whether the colorant is specified in any of the predetermined area; and a coating depositing structure for depositing an image-enhancing coating over the subject pixel on the substrate if the first determining structure determines that the colorant is so specified.

According to a fourth aspect of the invention, a system for printing a predetermined image on a substrate may include a structure for obtaining pixel data in a first format representing a plurality of colors for a subject pixel and a predetermined number of surrounding pixels, the pixels being arranged in rows and columns, the pixels rendering a portion of the predetermined image; a first structure for determining if any of the row pixels specifies a colorant by ORing the row pixels; a second structure for determining if any of the ORed pixels in columns specifies a colorant by ORing the ORed pixels; and a coating structure for depositing an image-enhancing coating onto the subject pixel on the substrate in response to the first or second determining means.

According to a fifth aspect of the invention, a system for printing a predetermined image on a substrate may include a plurality of print head elements; a structure for supporting the substrate relative to the print head elements; a multilayered coating application ribbon positioned between the substrate and the print head elements, the multilayered ribbon comprising a backing layer, a separation layer adjacent to the backing layer which is formulated to separate from the backing layer when heated, and a adhesive layer which is formulated to adhere to the substrate; and a structure for controlling the printhead elements, the controlling means being constructed and arranged to: obtain pixel data relating to whether a colorant is to be deposited in a predetermined area comprising at least one subject pixel and at least one adjacent pixel, the predetermined area rendering a portion of the image; determine whether a colorant is specified for any of the predetermined area; and selectively activate the print head element to apply an image-enhancing coating over the subject pixel on the substrate if the above determining step determines that the colorant is so specified.

According to a sixth aspect of the invention, a method of operating a thermal transfer printing apparatus including a plurality of heating elements adapted to be juxtaposed to a carrier comprising a colorant and an image-enhancing coating for printing on a substrate, may include the following steps of obtaining pixel data relating to whether a colorant is to be deposited in a predetermined area comprising at least one subject pixel and at least one adjacent pixel, the predetermined area rendering a portion of the image; determining whether a colorant is specified for any of the predetermined area; determining a heating element corresponding to the position of the subject pixel on the substrate; and energizing the heating element to deposit the image-enhancing coating on the substrate if the determining step determines that the colorant is so specified.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 14 is a schematic depiction of an "on-the-fly" determination of a larger coating area.

FIG. 16 is a diagram illustrating a full-step vertical displacement of the printhead.

FIGS. 17A and 17B are diagrams illustrating a half-step vertical displacement of the printhead.

FIG. 18 schematically shows enlarged and different views of the half-step vertical displacement of the printhead depicted in FIG. 17B.

DETAILED DESCRIPTION

Figure 1:
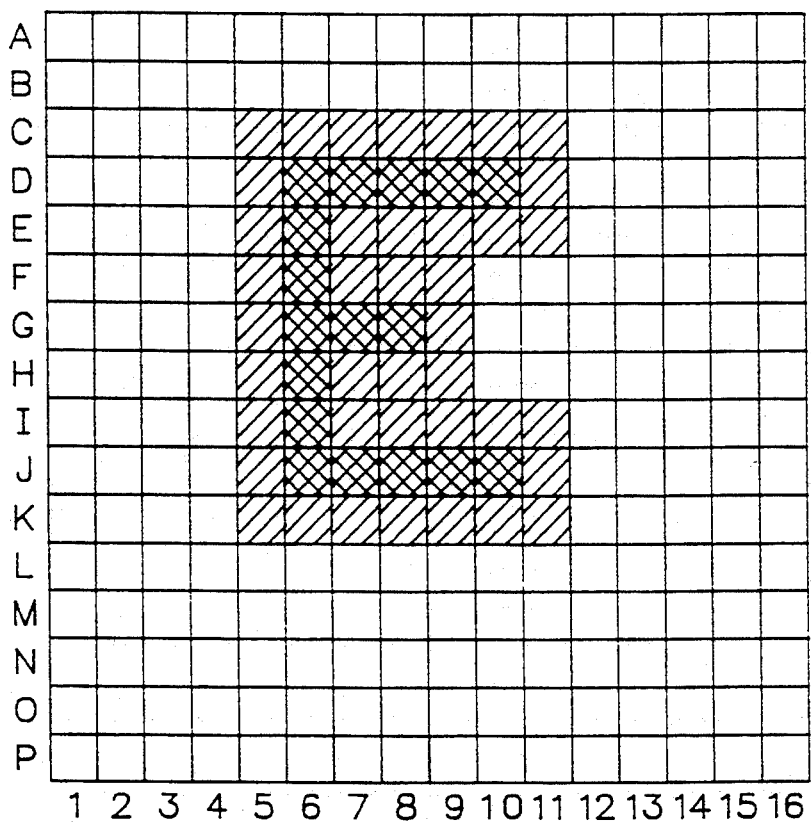
FIG. 1 is a diagram illustrating two areas which are pertinent to a preferred embodiment of the invention, the surround area and the shadow mask area for a letter "E."

Referring now to the drawings, wherein like reference numerals designate corresponding structure throughout the views, and referring in particular to FIG. 1, the letter "E" is depicted in printed form on the surface of a substrate, such as plain paper. If the surface of the plain paper is rough and considered to have a series of alternating peaks and valleys, the precoat material is formulated so that each precoat pixel will cover the rough surface to provide a colorant receiving surface which is more uniform than the rough surface. The precoat material may also be applied to smoother surfaces for the purpose of making the surface more chemically compatible for certain types of colorants, such as for dye diffusion-type printing. This invention provides a method for determining the extent of the area to which the image enhancing precoat will be applied. In creating the image of the letter "E" as shown in FIG. 1, both a first area directly underneath the image and an immediately adjacent second area are precoated.

Still referring to FIG. 1, the first area directly underneath the image may be termed the shadow mask area. The second area which is adjacent to the shadow mask area may be termed the surround area. While the precoat which is applied over the shadow mask area is intended to provide a colorant receiving surface, the precoat over the surround area is not so intended, although colorant inadvertently may be applied to the surround area due to misregistration between the precoat and the application of the colorant, or the spreading effect caused by the lower viscosity of the colorant. This is most likely to happen during the course of multipass printing. Thus, the surround precoat serves to supplement the shadow mask precoat in enhancing an image on the edges of the image.

Figure 2:
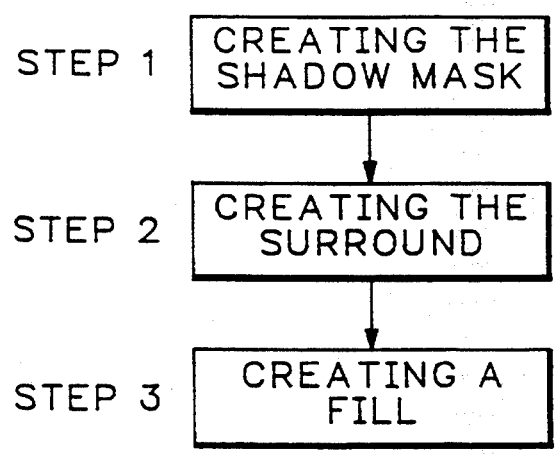
FIG. 2 is a general flow chart depicting the preferred steps involved in determining the two areas illustrated in FIG. 1, according to one embodiment of the invention.

FIG. 2 is a flow chart which provides an overview of a process according to a preferred embodiment of the invention. In order to determine the area where precoat material will be deposited on to the surface of the substrate, the preferred embodiment of the invention may be considered to include three major steps. The first two steps, namely Step 1 and Step 2, are necessary, while the last step, Step 3, is optional.

Step 1 involves the creation of a shadow mask array. The shadow mask array stores information on which pixel areas on substrate are intended to receive both colorant and precoat material. In other words, the shadow mask array defines an area directly underneath the intended image where both the precoat and colorant are deposited.

Still referring to FIG. 2, Step 2 involves determining the extent of the surround area which surrounds the shadow mask area. The purpose of the surround area, to which precoat material is also intended to be applied, is threefold. First, the surround area improves adherence of the precoat in the shadow mask area to the substrate through an anchoring effect. Second, the surround precoat provides a border area over which colorant having a lower viscosity than the precoat material may spread. Thirdly, the border area also compensates for possible misalignment which might take place during the colorant application process.

The surround area is created as a function of the first shadow mask area, but the specific function or method used to determine the surround area can be adjusted, as will be described in greater detail below. Specifically, the size or the pattern of the surrounding area can be varied. For example, the surround area may be defined as a one-pixel band around the edges of the shadow mask area. Thus, the shadow mask area together with the surround area make up the precoat area where the image enhancing precoat is applied.

Optionally, the precoat area defined by the shadow masks and the surround may be further optimized. Such optimization, shown in Step 3 in FIG. 2, will, under certain circumstances, substantially improve the quality of an image. Precoat areas corresponding to dense image or shadow mask area regions tend to adhere well to the substrate because the precoat pixels in such regions are contiguous with many other precoat pixels. However, precoat pixels corresponding to sparse regions, such as regions including a single, free-standing pixel of colorant tend to have problems adhering to the substrate, even with a one pixel border of precoat therearound. The optimization depicted in Step 3 thus fills in the areas adjacent to sparse shadow masks with more precoat material while trimming the precoat surround areas in dense shadow mask regions, to avoid surplus precoating. Each of the three steps will be described in greater detail hereinbelow.

Figure 3:
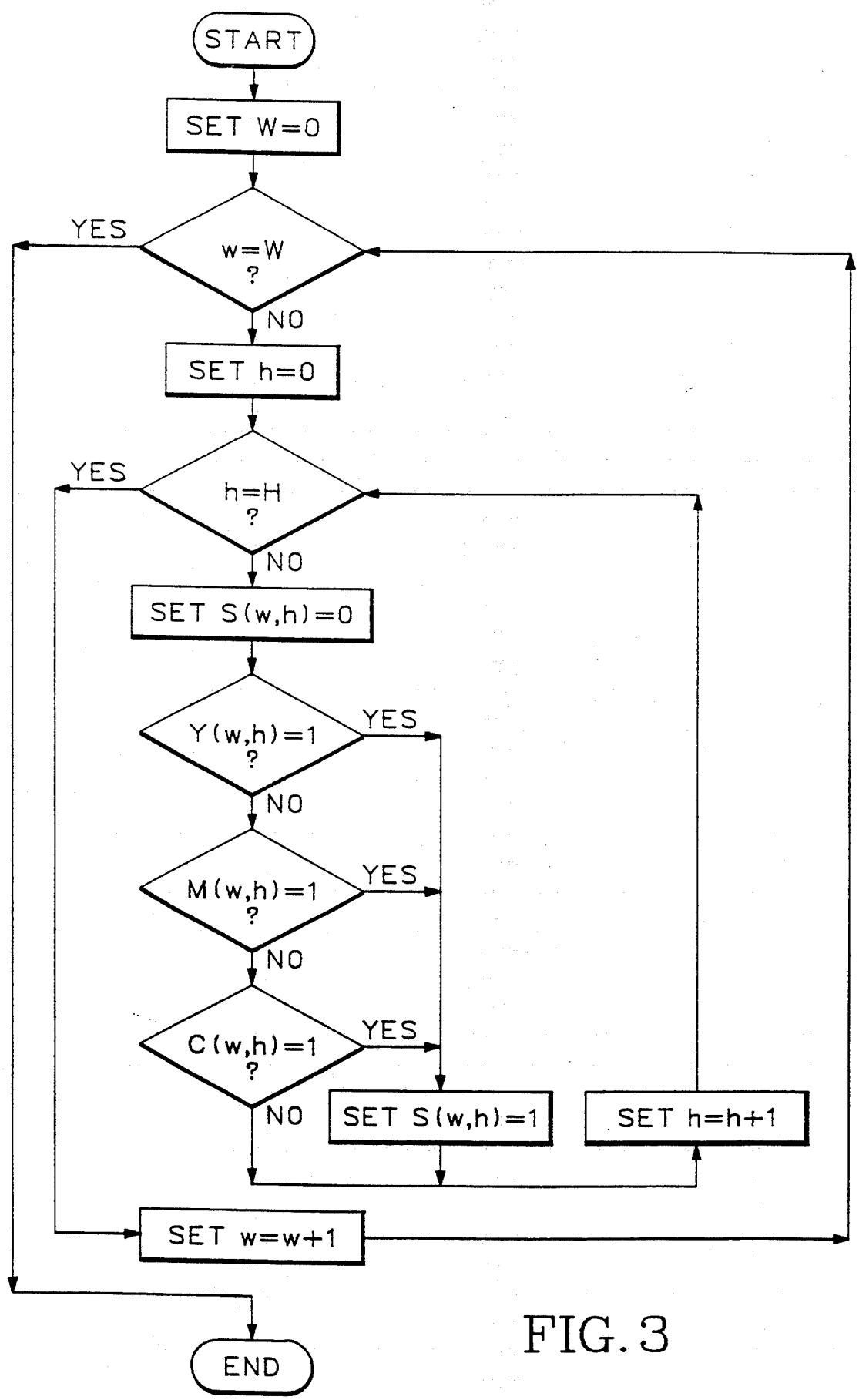
FIG. 3 is a flow chart illustrating one implementation of a step for determining the shadow mask area to which both precoat and colorant materials are applied according to the invention.

Referring now to FIG. 3, one embodiment of Step 1 of FIG. 2 will now be described in detail. The shadow mask defines an area where both precoat and colorant will be deposited to produce an image. In order to determine this area, according to a preferred embodiment of the invention, the colorant information is traversed on a pixel by pixel basis. The process of creating the color information is well-known to those having ordinary skill in the relevant art and will not be elaborated on herein. To perform this process, a variable, w is first initialized to zero. w specifies a particular column of pixels on plain paper, and w ranges from 0 to the constant W, which is the width of the substrate in pixels. If w is not yet equal to W, the variable h is also initialized to zero. h specifies a particular row of pixels on the substrate, and h ranges from 0 to the constant H, which is the height of the substrate in pixels. Thus, a combination of w and h specifies a unique pixel on the substrate, and the specified pixel corresponds to a pixel in the shadow mask array S. Once a particular column, w is set, all the pixels in the column are examined on a pixel by pixel basis by incrementing h by one (set h=h+1) as shown in FIG. 3.

The shadow mask array S is a two dimensional array, according to the preferred embodiment. $S(w, h)$ specifies a unique pixel, and its stored value indicates whether the precoat material is deposited over the pixel. Prior to setting specific elements of $S(w, h)$ to indicate that those corresponding pixels will receive both colorant and precoat, all elements of the array are initialized to zero to indicate that no precoat material is to be deposited over the pixel as shown by set $(w,h)=0$ in FIG. 3. Upon examining the color information, if any colorant is to be deposited over the pixel in question, $S(w, h)$, is set to one. The color information is stored in three sets (Y, M, C) of two-dimensional arrays. Yellow (Y), magenta (M) and cyan (C) arrays separately keep the color information corresponding to that particular color for each pixel on the plain paper. For example, a stored value in $Y(w, h)$ specifies whether the yellow colorant is to be deposited over a pixel located at the "w" column and "h" row. If the stored value is 1, the yellow colorant material is to be deposited over the pixel. More than one color may be deposited over the same pixel if corresponding color arrays so specify. These two dimensional color arrays may be sometimes referred to as a color plane.

For the purpose of determining whether image enhancing precoat is to be deposited on a given pixel, it is sufficient to ascertain whether any colorant is intended for placement at that pixel. After $S(w, h)$ is initialized to zero, $Y(w,h)$, $M(w,h)$ and $C(w,h)$ are examined one at a time. As soon as one of them is found to have a value of one, the corresponding shadow mask array element $S(w, h)$ is set to one. In FIG. 3, a series of three questions, i.e., $Y(w,h)=1?$, $M(w,h=1)?$ and $C(w,h)=1?$ examines the color information, and as soon as one of the examinations is affirmative, a corresponding shadow mask element is set by $S(w,h)=1$ and no further inquiry takes place. On the other hand, if none of these color arrays has value 1 for the same pixel, $S(w, h)$ remains zero. At this point, regardless of the result of the examinations, h is incremented by one for the next iteration.

This process repeats for all the pixels in the same column specified by w. When all the pixels in the same column were examined, h would be incremented to the constant, H. Thus, the test h=H is satisfied. Accordingly, w is incremented by one to specify the next column for the examination of all the pixels in the adjacent column. When all the pixels are examined on a column and row basis, w=W is satisfied. Thus, Step 1 terminates as shown in FIG. 3. The shadow mask array, S now stores the information pertaining to the area on which the precoat material and colorant are applied.

Figures 4A, 4B, 4C:
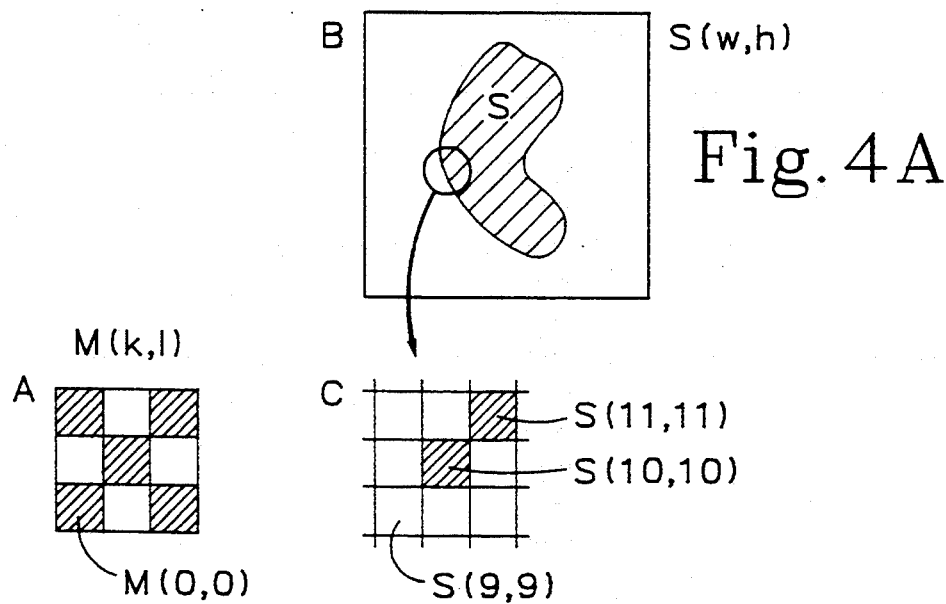
FIGS. 4A, 4B and 4C illustrate how a portion of the shadow mask area (shown in FIG. 4B and enlarged in FIG. 4C) will be expanded to create the surround area according to a filter which specifies the pattern of expansion as shown in FIG. 4A.

Referring now to FIG. 4, it will be seen in detail how the surround area will be determined based upon a predetermined filter and the shadow mask array S. The filter or mask is a two-dimensional array designated by $M (k, l)$, where k ranges from 0 to $K-1$ and l ranges from 0 to $L-1$. K and L are constants, and they limit the size of the filter. For example, as shown in FIG. 4A, the filter M is 3 pixels wide and 3 pixels long. Thus, both K and L are 3 in this example. The size of the pixel in the filter M corresponds to that of a pixel on the substrate. In the example, the lower left pixel of the filter is identified by $M(0,0)$. The filter M is set to a predetermined pattern as shown in FIG. 4A by setting $M(0,0)$, $M(0,2)$, $M(1,1)$, $M(2,0)$ and $M(2,2)$ to one, while setting the rest of elements in the array to zeroes. This pattern of zeroes and ones determines how the shadow mask area will be expanded to create the surround areas on the boarder of the shadow mask area.

To explain the expansion process, a simplified case is conceptually explained using FIG. 4. For example, FIG. 4B diagrammatically shows a shadow mask area designated by S. FIG. 4C is an enlarged view of pixels in the circled area in FIG. 4B. Since the circled area is on the border between the shadow mask area and its adjacent areas, FIG. 4C shows that two pixels, $S(11,11)$ and $S(10,10)$ are a part of the shadow mask area while the rest of pixels is not. When the filter M is placed over the pixels that are a part of the shadow mask area, the filter M specifies how the shadow mask area is to be expanded. Thus, when the filter M of FIG. 4A is placed over the shadow mask area as shown in FIG. 4C, $M(0,0)$ and $M(2,2)$ are respectively superimposed on $S(9,9)$ and $S(11,11)$. Since $S(11,11)$ and $S(10,10)$ are a part of the shadow mask area and the filter M specifies the predetermined pattern, the adjacent pixels $S(9,11)$, $S(9,9)$ and $S(11,9)$ are included in the surround area to receive the additional precoat material over their pixels. As the mask M moves around over the shadow mask area and when S(9,11), S(9,9) and S(11,9) are placed at a center of the mask, according to a preferred embodiment of the invention, these pixel locations are included in the surround area. As a result, the shadow mask area is now expanded to create the surround area.

To depict the preferred method for implementing the procedure broadly shown in step 2 of FIG. 2, FIG. 5 will now be described in detail. As in Step 1, all the pixels on the substrate are compared on a pixel by pixel basis against the filter M. Variable w specifies a column and ranges from 0 to W, which is a constant specifying the width of the substrate in pixels. Variable h specifies the row and ranges from 0 to H, which is a constant specifying the length of the substrate in pixels. The pixel by pixel comparison of Step 2 is different from that of Step 1 in that every pixel in the filter M is compared against every pixel in the substrate. Accordingly, there are two more inner loops for iteration based upon k and l within the outer loop based upon w and h. The filter M is a two-dimensional array defined by M(k, l), where k ranges from 0 to K and l ranges from 0 to L. K is a constant specifying the width of the filter M in pixels, while L is a constant specifying the length of the filter M in pixels. According to the embodiment shown in FIG. 5, both K and L must be odd numbers. When w is smaller than W and h is smaller than H, k is initialized to zero. At the same time, the precoat array P (W,h) is also initialized to zero. This two-dimensional array P defines the surround area adjacent to the shadow mask area and the shadow mask area. If P(w,h) is set to one, a corresponding pixel on the plain paper receives at least the precoat material. To proceed to the inner loop, if k is not equal to K or P(w,h) has not been set to one, l is initialized to zero. Then, the inner loop compares l to L. If l is not yet equal to L or P(w,h) has not been set to one, a test to expand the shadow mask area for creating the surround area is now performed.

Figure 5:
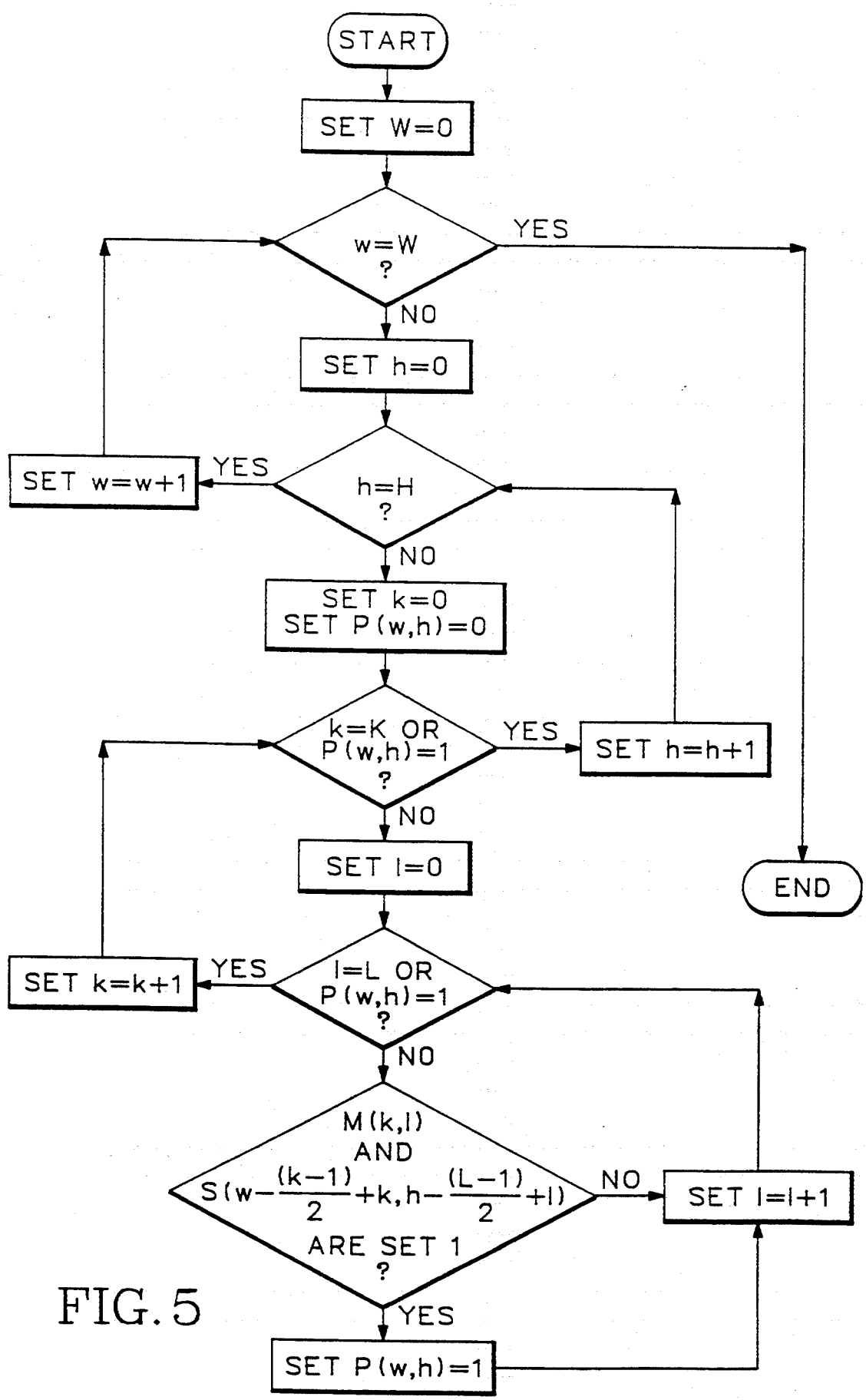
FIG. 5 is a flow chart illustrating one implementation of a step to determine the surround area.

Still referring to FIG. 5, to determine whether P(w,h) is set to one, two conditions have to be satisfied. The first condition is that the pixel in the filter M specified by M(k,l) has been set to one. The second condition is that for the given values of k and l, the pixel in the shadow mask array specified by S(w-(K−1)2+k, h-(L−1)/2+l) has also been set to one. S(w-(K−1)/2+k, h-(L−1)/2+l) represents a pixel in the shadow mask area that corresponds to the relative position of the filter M for a given set of k and l when the center of the filter M is superimposed on the shadow mask pixel at S(w, h). While in the inner loops, if any of filter pixels at M(k,l) has been set to one and the shadow mask pixel that corresponds to the relative position of the filter pixel in question has been also set to one, the precoat array at P(w, h) will be set to one. It is also noted that elements in the precoat array pixels which represent the shadow mask area are also set to one during this determination. Thus, the precoat array defines an area that include both the shadow mask area and the surround area. During the iteration of the inner loop, variable, l is incremented by one to examine every pixel in the same column of the filter M. When the entire row is finished, k is incremented by one to move to the next column in the filter M. Thus, the pattern specified in the filter M expands the shadow mask area to create the precoat surround area. If the filter M has a 3 by 3-pixel pattern as shown in FIG. 4A, for every marked shadow mask pixel, its four surrounding corner pixels are marked as precoat area pixels. If, on the other hand, every mask pixel is marked, every side and every corner of each of the marked shadow mask pixel is expanded to be included in the precoat array. The latter pattern provides a wide surround area. The former pattern creates a narrower surround area for a better image-enhancing output. In addition, the former pattern also saves some nominal amount of print head life. When all the pixels in the filter M are compared against the corresponding pixels in the shadow mask area, h is incremented by one to repeat the inner loop. This is repeated until all the pixels in the same column of the shadow mask area are compared. Then, w is incremented by one to compare the next column in the shadow mask area against the filter M for the inner loop. Upon completion of Step 2, the precoat area array P defines the total area where the precoat materials will be deposited.

Figures 6A, 6B, 6C, 6D, 6E, 6F, 7B:
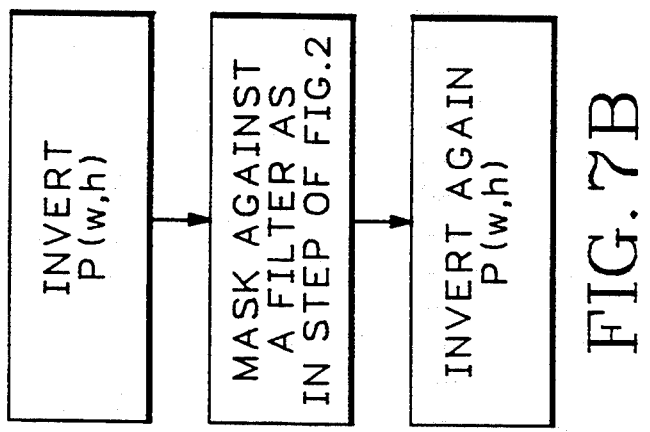
FIG. 6A illustrates one row of a two-dimensional pixel array representing a portion of the shadow mask area.
FIG. 6B is a resulting shadow mask from the array depicted in FIG. 6A, after application of a mask.
FIG. 6C is an inverted shadow mask area of FIG. 6B.
FIG. 6D is a resulting expanded inverted shadow mask area of FIG. 6C, after application of a mask.
FIG. 6E is a resulting double-inverted expanded shadow mask area of FIG. 6D.
FIG. 6F is a copy of FIG. 6A, which is provided for a convenient side-by-side comparison with FIG. 6E.
FIG. 7B is a general flow chart illustrating another implementation of a step for optimizing the shadow mask area and the surround area to which the precoat material is applied according to the invention.

Once the precoat area is determined in Step 2, an optional Step 3 can be performed to optimize the precoat area. The optimization is to counteract a specific phenomena created by a particular precoat formulation. While some formulas for the precoat allow colorant to adhere in a dense shadow mask region, they do not allow colorant to adhere well in a sparse shadow mask region. An improvement is made by filling the sparse shadow mask area with a greater area of precoat material and reducing the precoat area around the dense shadow mask area. For example, reference is made to FIG. 6A, which depicts a row of shadow mask area. For the sake of simplicity, only one row will be considered in the following description. When a 7 by 7 filter with every pixel set to one is applied to the shadow mask area, the surround area indicated by the circled ones is created as shown in FIG. 6B. By leaving the dense surround area of FIG. 6B such as between the original second and third ones from the left edge of FIG. 6A and trimming the precoat area along the dense area such as the original ones on the right hand side of the row in FIG. 6A, the precoat area indicated by the underlined ones in FIG. 6E is obtained.

Figure 7A:
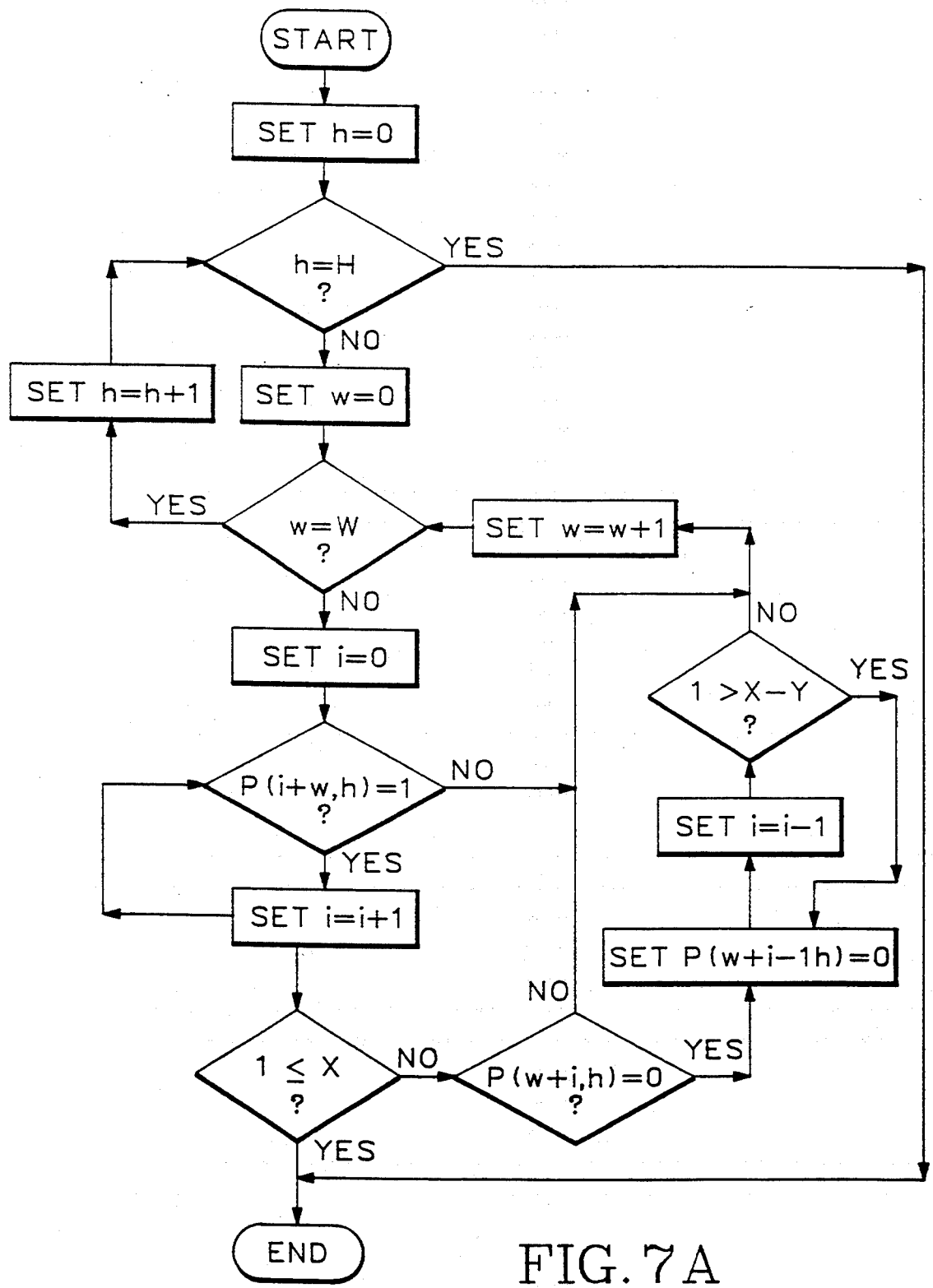
FIG. 7A is a flow chart illustrating one implementation of a step for optimizing the shadow mask area and the surround area to which the precoat material is applied according to the invention.

One embodiment of Step 3 is illustrated by FIG. 7A. The edges of the precoat areas are trimmed by examining the number of contiguous pixels from the pixel in question. When there are more than a predetermined number of contiguously marked pixels and the immediately adjacent pixel to the most peripheral pixel of the contiguously marked pixels is not marked, the peripheral pixels are turned off. For example, after a 7 by 7 filter is used to create the shadow mask area, a 5 by 5 inverse filter is run against the shadow mask area and the surround area. The inverse filter specifies a pattern to convert the on-pixels to off-pixels. Since the 7 by 7 filter creates at least 3 pixel-wide surround area, the 5 by 5 inverse filter turns off the on pixels that are two peripheral pixels which are surrounded by any other off pixels in this example.

One way to implement Step 3 is shown in the flow chart of FIG. 7A. h and w respectively represent the row and the column of a pixel on the plain paper substrate. While the variable, h ranges from 0 to the constant H, which is the height in pixels, the variable, w ranges from 0 to W, which is the width in pixels. To start, h is set to zero. If h is not yet equal to H, then w is initialized to 0. When w is not yet equal to W, a counter i is initialized to one. One element of the precoat area array P is examined at a time. If the current element, P(i+w, h) has been set to one, the counter is incremented by one in step i=i+1. If the counter i is equal to or smaller than the predetermined surround width, $X(i \leq x)$, the next precoat pixel is examined. The examination is repeated for each of the peripheral pixels $P(i+w, h)$ in the predetermined X-pixel width. If any of the pixels in the X-pixel wide surround area has not been turned on, w is incremented by one ($w=w+1$) and a new cycle of examination starts. On the other hand, if all the pixels in the X-pixel wide surround area are turned on, the immediately adjacent pixel, $P(w+i,h)$ is examined where $i=X$. If this immediately adjacent pixel has been turned off, X-Y number of peripheral pixels on the edge of the precoat area will be turned off by setting $P(w+i-1, h)$ to zero $(P(w+i+1,h)=0)$. This inverting process is repeated while $i \geq =X-Y$, where X-Y is the number pixels that will be turned off. When this process is finished, w is incremented by one ($w=w+1$). Although the flow chart in FIG. 7A shows the increment of h for rows, for the sake of simplicity the above described inversion process in this direction is not included in the flow chart. Thus, the constant H is 1. When all pixels in this row h are examined, the process ends.

Another embodiment for Step 3 is described in FIGS. 6 and 7B. FIG. 7B describes the embodiment in general terms. The precoat area P is inverted first, then, a normal filter M of a desired size is used to expand the inverted area as described in Step 2 of FIG. 2. Lastly, the expanded inverted area is once again inverted. As a result, the same effect as the first embodiment illustrated in FIG. 7A is obtained. Instead of inverting a portion of the surround area, this alternative embodiment first inverts every pixel in the precoat area as shown in FIG. 6B to achieve the inverted pixels of FIG. 6C. A normal filter that is similar to one described in Step 2 of FIG. 2 is run against the inverted pixels, as shown in FIG. 6C. In this example, the filter is a 5×5 pixels in size, and every pixel has been set to one. As a result, the edges of the on pixels are expanded to the pixel pattern as shown in FIG. 6D. When all the pixels in FIG. 6D are inverted again, the pixel pattern in FIG. 6E is obtained. A series of two inversions has led to the same result as the first embodiment. Since the second embodiment can use the same process as described in Step 2 of FIG. 2 and the inversion of entire pixel array is relatively simple, the second embodiment may be easier to implement than the first embodiment.

Some or all of the above-described steps in determining the precoat area may be combined into a single step in another embodiment of the invention. Although the complexity of the single process increases due to its more computation-intensive nature, some memory space can be saved as a trade-off. This "on-the-fly" approach may combine the determination of the shadow mask area and the surround area into a single step without storing an intermediate result in the shadow mask array. To accomplish this, the color information stored in the three sets (Y, M, C) of two-dimensional arrays is compared directly against the filter to create the precoat area without first creating and storing the shadow mask area. The computation may be performed during actual printing. Thus, the memory space which would otherwise be used for storing the entire shadow mask area is saved.

The preferred embodiment of the "on-the-fly" approach further includes the above described optimization step. In addition to combining the steps of creating the shadow mask area array and the surround area array, the optional step of optimizing the precoat area array is performed on an "on-the-fly" basis. To accomplish this, one approach is to implement a more sophisticated filter such as a three-dimensional filter in which layers of a two-dimensional filter are stacked on top of each other. Thus, for example, after the shadow mask area is expanded according to one layer of the filter, another layer of the inverse filter specifies how the expanded area should be reduced or further enlarged. This combined process may save further memory space as no intermediate result is stored in an additional memory array.

Figure 8:
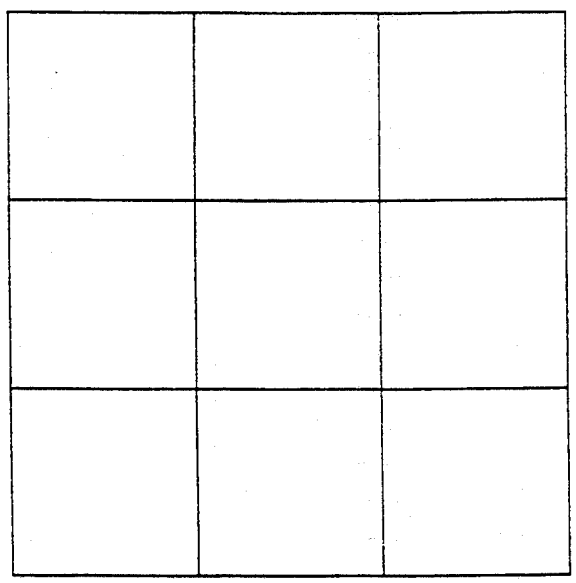
FIG. 8 is a schematic depiction of a 3-by-3 pixel block which is used as one example of a basic unit for the "on-the-fly" approach according to the invention.

According to one preferred embodiment of the invention, the above-described "on-the-fly" approach has been implemented as follows: Referring to FIG. 8, a 3-by-3 pixel block may be used as a basic unit of comparison for this implementation. A fundamental concept is that if a center data pixel in the 3-by-3 block receives any color, all the pixels in the block will receive a coating material. However, for the preferred embodiment, the logic is reversed so that if any of the pixels in the block will receive colorant, the center pixel will also receive the coating material. The "on-the-fly" approach with this logic efficiently compares a large number of pixels so that the system performance is not sacrificed.

Figure 9A:
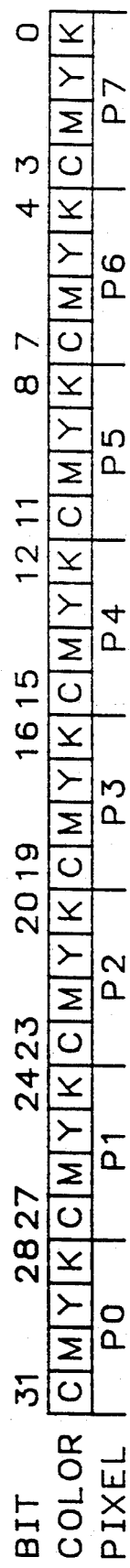
FIG. 9A schematically shows output pixel data from a PostScript interpreter in a "chunky" format in which each pixel has four adjacent memory bits for four colors including cyan, magenta, yellow and black.

FIG. 9A shows pixel data of eight adjacent pixels in one data format called "Chunky Form." Pixels, P0-P7, each have four different colors specified thereof which include Cyan (C), Magenta (M), Yellow (Y) and Black (K), and each color requires one bit. Accordingly, the eight pixels, P0-P7 require 32 bits of information (bit 0-31). However, as described above in reference to FIG. 3, the presence of but one color will determine the surround area where a coating material will be deposited. Therefore, the above-described "chunky-form" data structure for the pixel data may be redundant and is not an efficient data structure for further processing under the "on-the-fly" approach.

Figure 9B:
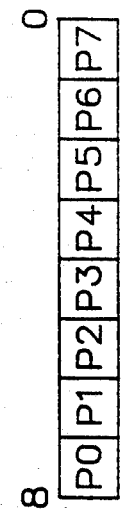
FIG. 9B schematically shows a printer FIFO input format which accepts eight pixels at a time for a given color or a coating material.

FIG. 9B shows another data structure called "Planar Form." This 8-bit data structure is an efficient way of encoding the presence of any color for each pixel. Each bit of the byte indicates the presence of at least one color. This format is an efficient data structure for the deposition of the coating material. In fact, many printer engines have the planar format as an input for controlling the printer head.

Figure 9C:
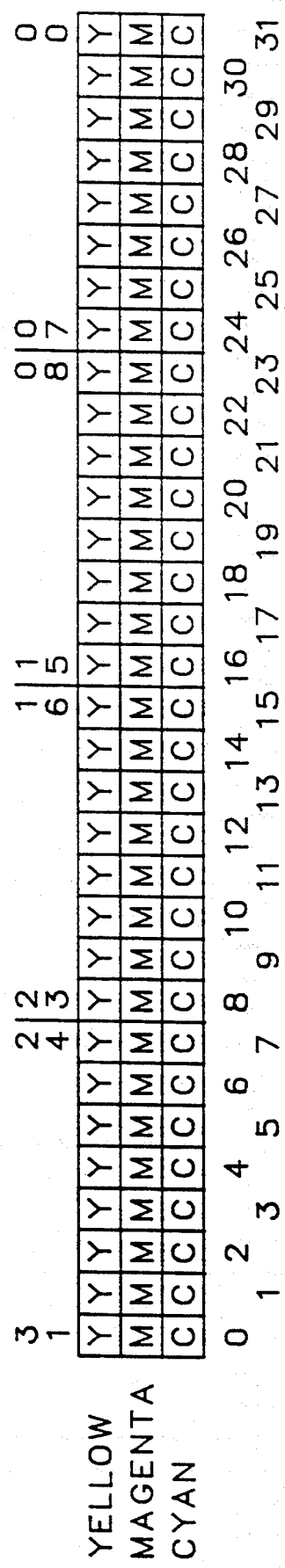
FIG. 9C schematically shows output pixel data from a PostScript interpreter in a "planar" format in which adjacent memory bits signify colorant for adjacent pixels.

FIG. 9C shows another example of the planar data format. Although this example is similar to the format shown in FIG. 9B, each color such as cyan, magenta, yellow and black has its own color information. Unlike the chunky format output, the adjacent addresses contain bits of color information which do not belong to the same pixel. All the pixels of one color plane are defined in a contiguous memory space.

A PostScript (Postscript is a registered trademark of Adobe Systems Incorporated) interpreter can output either "chunky" or "planar" pixel data format as respectively shown in FIG. 9A and FIG. 9C. However, some printer engines, such as the Sharp A4JX-560 used in the Phaser ™ 200e and 200i printers marketed by Tektronix, Inc. require the planar form for its input. If the pixel data is already in the planar form, no conversion is necessary before outputting to a planar-format printer engine. On the other hand, if the pixel data is in the chunky format, the pixel data must be converted to the planar form before outputting to a planar-format printer engine. Since the pixel data is used for some other purposes other than printing, the printer-compatibility may not be the primary consideration for the choice of the PostScript interpreter output format. However, an extensive computation may be necessary in converting the pixel data in the chunky form into the planar form. Such computation may deteriorate the system performance even though a physical memory space is saved.

Figure 10:
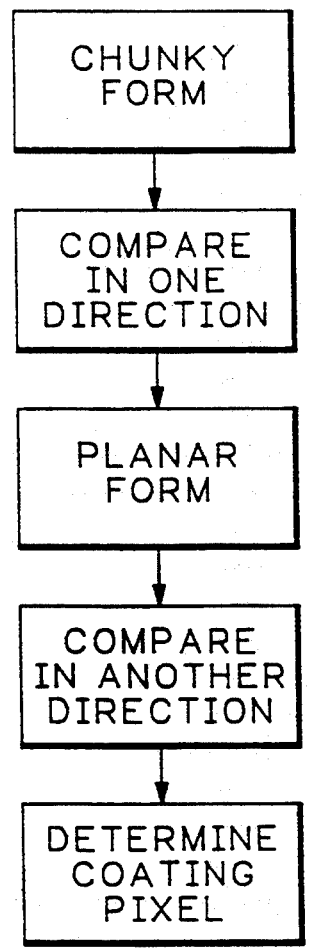
FIG. 10 is a general flow chart illustrating one embodiment of an "on-the-fly" determination of a coating area in which an image enhancing coating is to be applied.

A preferred embodiment according to the current invention efficiently converts the chunky form into the planar form without sacrificing the system performance. FIG. 10 shows a general flow of one preferred embodiment according to the current invention. The system obtains the pixel data in the chunky form which was described in reference to FIG. 9A. The pixel data represents adjacent pixels which are arranged in rows and columns and render a portion of the predetermined image. The pixel data in the chunky form is compared with each other in one direction. For example, rows of the pixel data may be examined in one direction. Then,

---

| Data | = *(Card32*) (1Word−byteWide); | /* Fetch previous line data */ |
| Data \| | = *(Card32*) (1Word; | /* Fetch current line data */ |
| Data \| | = *(Card32*) (1Word+byteWide); | /* Fetch next line data */ |

--- the chunky form data is converted to the planar form which is shown in FIG. 9B. After the conversion, the pixel data in the planar form is again compared in another direction. For example, if the first comparison is among rows, the second comparison is among columns of the pixel data. The system now determines whether a center of the pixel block will receive a coating material based upon the result of the two comparisons. The whole process is repeated for each portion of the predetermined image. After repetitions, this implementation accomplishes the same effect as an alternative embodiment in which all pixels in the block will receive a coating material if the center pixel in the 3 ×3 block specifies any colorant.

Figure 11:
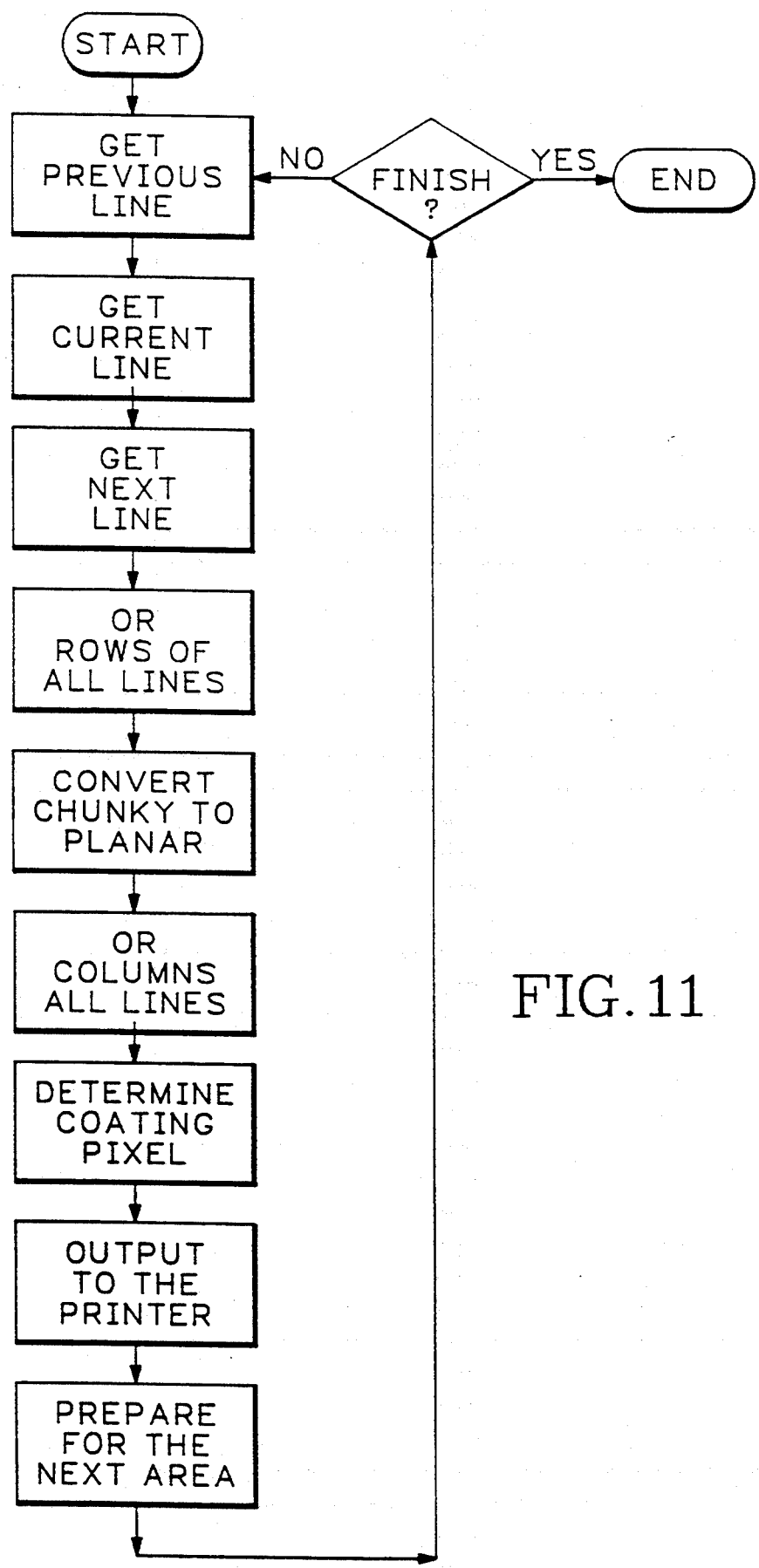
FIG. 11 is a flow chart depicting one preferred implementation of the manner in which the "on-the-fly" coating area determination is made.

FIG. 11 shows the details of the same embodiment as shown in FIG. 10. The first step of the determination is to read the pixel data for the previous, current and next lines. These lines are three adjacent rows of pixel data. For each line, the native format of rendered data of the Phaser™ P200i printer is "chunky" at four bits per pixel as shown in FIG. 9A. Each 4-bit pixel data dedicates one bit for each of the four colors which include magenta, cyan, yellow and black. A single 32-bit-word pixel data represents eight pixels which are arranged in ascending order from pixel 0 to pixel 7. These 32-bit data words from the three rows of pixels are ORed together to generate an intermediate result such as an initial chunky data value.

Figure 12:
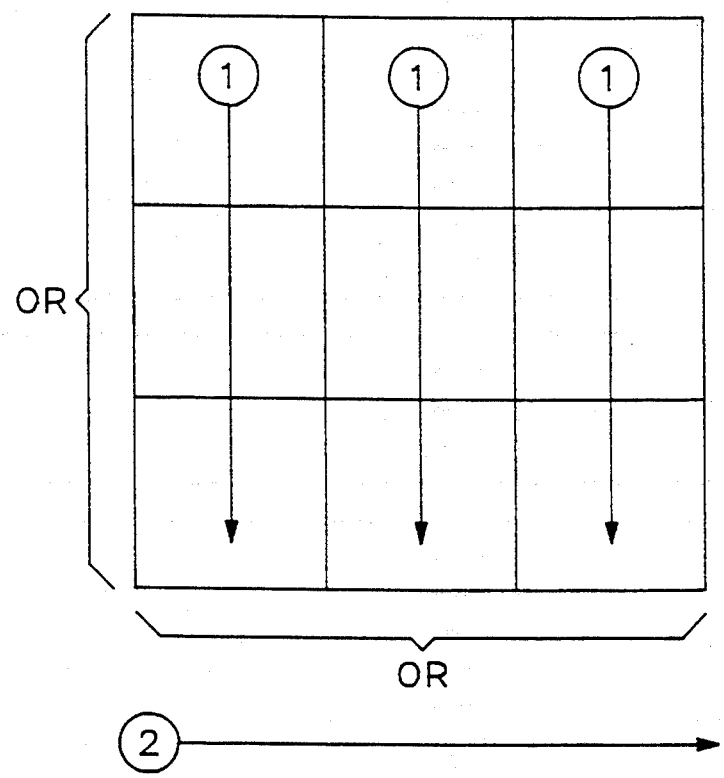
FIG. 12 is a schematic depiction of the "on-the-fly" coating area determination in which rows and columns of pixels are examined in a predetermined order.

Still referring to FIG. 11, the steps labeled as "Get Previous Line," "Get Current Line," "Get Next Line" and "OR rows of all Lines" are accomplished by OR statements in the C language such as shown below:

These OR statements essentially determine whether any colorant is specified among the rows of pixels as shown by the vertical arrows referenced by "1" in FIG. 12. The result of the OR operations on the rows of pixel data is called the initial chunky data.

The initial chunky data is now converted to the planar format. All the bits in each pixel are ORed together with its shifted data so that the zero bit will contain the result of OR operations on the four colors in the pixel. For example, the following three OR statements in combination with the right shifts by a predetermined number of bits in the C language show one implementation for this stage of the conversion.

---

| Data \| | = Data>>2; | /* convert the pixels to C    M    Y \|C    K    M\|        */ |
| Data \| | = Data>>1; | /* convert the pixels to C M\| C Y\| C   K\| M\| Y\| C */ |
| Data &= 0X11111111; | | /* zero upper 3 bits          0 0      0         K \|M \|Y \|C */ |

---

After the first OR-Shift statement, the zero bit of the Data variable will contain "K ¦ M" as described in the corresponding comment. After the second OR-Shift operation, the zero bit will contain "K ¦ M ¦ Y ¦ C." However, since the upper three bits contain undesirable intermediate results, they are initialized to zero by the third AND statement. Thus, the zero bit of the "Data" variable contains the desired result after the third statement. These operations are done on each pixel data. Thus, the lowest bit in each pixel now indicates whether the pixel specifies any color, and the 32-bit word now contains the following result.

```
31                                                                              0
0 0 0 P0¦0 0 0 P1¦0 0 0 P2¦0 0 0 P3¦0 P0 0 P4¦0 0 0 P5¦0 0 0 P6¦0 0 0 P7
``` where each Px represents ORed color planes of the pixel data. That is, Px represents Cx ¦ Mx ¦ Yx ¦ Kx.

In order to consolidate the OR result of each pixel in the lowest byte in the 32-bit word, the "Data" variable is again ORed and shifted. According to a preferred embodiment of the current invention, for example, the following two statements in the C language accomplish the above described consolidation:

Data ¦ =Data>>(16-2);

Data ¦ =Data>>(8-1);

After the first OR-shift operation, the 32-bit "Data" variable contains the following pixel data:

```
31                                                                              0
0 0 0 P0¦0 0 0 P1¦0 0 0 P2¦0 0 0 P3¦0 P0 0 P4¦0 P1 0 P5¦0 P2 0 P6¦0 P3 0 P7
```

After the second OR-shift statement, the 32-bit "Data" variable now contains the following pixel data:

0 0 0 P0 | 0 0 0 P1 | 0 0 P0 P2 | 0 0 P1 P3 | 0 p0 p2 p4 | 0 P1 P3 P5 | <u>P0 P2 P4 P6</u> | <u>P1 P3 P5 p7</u>

The underlined low byte, bits 0-7 contains the ORed information of interest. Since the pixels P0-P7 are not in an ascending order, the system uses a look-up table to rearrange these bits into an ascending order. The look-up table is called the swizzle table, and the look-up is accomplished by the following C language statement:

```
nextData=*(char*)(swizzle+(Data&0xff)); /* Get
    P0P1P2P3P4P5P6P7 from
    P0P2P4P6P1P3P5P7*/
```

Thus, the step, "Convert chunky to planar" in FIG. 11 is accomplished by the above five C language statements.

Once the chunky data is converted to planar data, it is stored in one of the three 32 bit variables; "preV-Data," "CurrData," and "nextData."

```
prevData; /* Contains ORed pixels, P-8,-1 thru P-1,1 |
    P-8,0 thru P-1,0 | P-8,1 thru P-1,-1 */ currData; /* Contains ORed pixels, P0,1 thru P7,1 |
    P0,0 thru P7,0 | P0,-1 thru P7,-1 */ nextData; /* Contains ORed pixels, P8,1 thru P15,1 |
    P8,0 thru P15,0 | P8,-1 thru P15,-1 */
```

In other words, these data variables which contain the result of the Boolean OR operation on the rows of pixels in the previous, current and the next lines. Conceptually, such OR operations are shown but the arrows which are marked "1" in FIG. 12.

Figure 13:
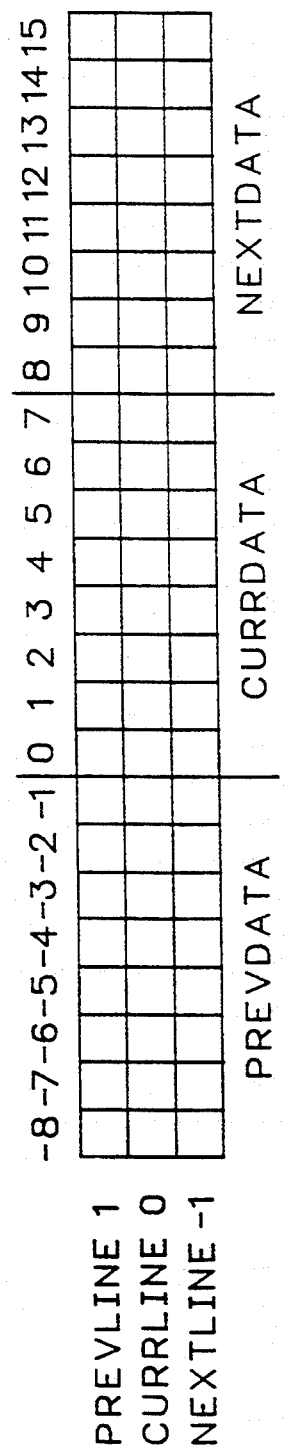
FIG. 13 schematically shows which pixels are ORed together from the current, previous and next lines.

FIG. 13 depicts as to which pixels are ORed together for the above-described variables. The corresponding comment for a variable specifies three groups of pixels which are ORed and stored in the variable.

The next step is to OR the results of the row comparison. That is, the results in the planar form are compared in another direction. However, the row comparison does not necessarily precede the columnar comparison. The following C language code, for example, performs a row comparison:

```
data  = currData>>1;   /* OR in the adjacent left column  */
data |= currData<<1;   /* OR in the adjacent right column */
data |= currData;      /* OR in the center column         */
data |= prevData<<7;   /* take care of the left side      */
data |= nextData>>7;   /* take care of the right side     */
```

Again, this columnar determination is conceptually shown by the arrows marked by "2" in FIG. 12. The result of the columnar determination finally determines whether a center pixel in the 3-by-3 block receives a coating material. These final steps in FIG. 11 are described as "OR columns all lines" and "Determining Coating Pixel." In essence, they accomplish the following effect: if any of the 9 pixels specifies a color, the center pixel will receive a coating material over its corresponding surface on the substrate. In another preferred embodiment, the 3×3 block is expanded to 3×8 pixel block. As shown in FIG. 14, the 3 rows of 8 pixels are compared first in the direction shown by the vertical arrows marked "1." The ORed results in the chunky form are converted into the planar form. Then, the pixels, P0 through P7 are ORed with adjacent pixels in a columnar direction as shown by the arrows marked "2" in FIG. 14. On the edge of the 3-by-8 pixel block, adjacent pixels P−1 on the left and P8 on the right are also compared against the adjacent pixels to ascertain an accurate coating. When columnar determinations are completed, the variable "Data" contains the pixel data for P0-P7 to indicate whether its respective center pixels, "A" through "H" as shown in FIG. 14 will receive a coating material.

After the determination of the coating pixels, the system now outputs the result to a printer. One preferred embodiment utilizes either Phaser™ 200e or monochrome 200i printers which requires the planar form for its input. However, a color Phaser™ 200i printer, for example, require the chunky form for its input. The step, "output to the printer" in FIG. 11 may be a single assignment to the printer input port address. For example, the following C language statement accomplishes the "output to the printer" step.

```
*ENGINE_FIFO_U = Data;   /* write coating data to FIFO */
```

After the output is sent to the printer at a First-In-First-Out buffer, a new cycle of the above-described determination is repeated for a next 3×8 pixel block of the predetermined image. In order to repeat, the contents of the three variables, "CurrData," "PrevData" and "NextData" should be swapped for the next iteration. This step is shown as "Prepare for the next area" in FIG. 11. The following C language statements accomplish this step:

```
PrevData=CurrData;

CurrData=nextData;
```

The determination continues until every portion of the predetermined image is completed.

A state machine determines whether a discrete block of pixels in the predetermined image is on the edge of the predetermined image. When a block of pixels is on the edge of the predetermined image, the state machine keeps tracks of record. When that block on the edge is examined by the above-described system for the deposition of a coating material, the system initializes a portion of the data values which correspond to pixels outside of the predetermined image. This initialization to zeroes enables the preferred embodiment to work without considering a special case for the block on the edge.

The preferred embodiment takes advantage of the triple bus architecture of the Tektronix 29000 processor and the instruction burst access hardware of the Tektronix controller. The internal part number for the Phaser™ 200i and 200e controllers is respectively 671-2603-00 and 671-2689-00. As long as the data value from a data read is not used as the operand of an instruction, execution will continue without delay. The following code example takes advantage of the above-described features. The data access of "j" takes place at the same time as the "OR" and shift instructions on "i."

```
int i, j;
char *lWord;
i = *(Card32*) (lWord+3*4);
j = *(Card32*0 (lWord+16*4);
i | = i>>1;           /* takes place during fetch of j        */
i | = i<<1;           /* executes during fetch of j           */
i | = j<<7;           /* executes after fetch of j completes  */
```

On the 24-MHz Model 200i, data access takes five instruction cycles. Thus, at least five 29000 assembly language instructions are executed between data reads or writes.

The preferred embodiment using a 29000 processor also minimizes the number of branch instructions in the inner loop. If the 29000 instructions are "in-line," the 29000 processor does not have to generate additional IREQ cycles with the corresponding delay for IRDY to be asserted. The 24-MHZ Model 200i controller requires 5 clock cycles between IREQ and IRDY in addition to one clock cycle to decode the instruction. Further, because the Branch Target Cache contains four instructions for each branch address, this translates into saving of two additional delay cycles per branch instruction. Thus, the preferred embodiment according to the current invention performs the "on-the-fly" determination without sacrificing the overall system performance.

According to an alternative embodiment under the "on-the-fly" approach according to the current invention, the PostScript planar output as shown in FIG. 9C is used. Since the pixel data is already in the planar format, no conversion from the chunky to planar format is necessary. Consequently, the alternative embodiment is somewhat simplified than the preferred embodiment. For example, the following C language statements show a relevant portion of the row comparison for the alternative embodiment of the invention:

```
nextData  = *(int*)(dataPointer−byteWide);    /* previous line yellow data  */
nextData | = *(int*)dataPointer;              /* current  line yellow data  */
nextData | = *(int*)(dataPointer+byteWide);   /* next     line yellow data  */
nextData | = *(int*)(plane1Pointer−byteWide); /* previous line magenta data */
nextData | = *(int*)plane1Pointer;            /* current  line magenta data */
nextData | = *(int*)(plane1Pointer+byteWide); /* next     line magenta data */
nextData | = *(int*)(plane2Pointer−byteWide); /* previous line cyan data    */
nextData | = *(int*)plane2Pointer;            /* current  line cyan data    */
nextData | = *(int*)(plane2Pointer+byteWide); /* next     line cyan data    */
```

Where "dataPointer," "plane1Pointer" and "plane2Pointer" are a pointer to a character and respectively initialized to point to an appropriate beginning address of the PostScript planar format pixel data. Each comment for the C statement indicates where the pointer should be pointing to. Notice that there are more data accesses in this embodiment as only one color plane is accessed at a time. However, 32 bits are processed per one iteration as opposed to 8 bits per iteration in the above discussed preferred embodiment. After ORing the rows of planar pixel data, the variable "nextData" contains bits indicating presence of any colorant for the thirty-two pixels.

The next step of the alternative embodiment is to OR the planar pixel data in the columnar direction as described above for the preferred embodiment. The following C language code, for example, performs such a comparison:

```
data  = currData>>1;     /* OR in the adjacent left column  */
data | = currData<<1;    /* OR in the adjacent right column */
data | = currData;       /* OR in the center column         */
data | = prevData<<31;   /* take care of the left side      */
data | = nextData>>31;   /* take care of the right side     */
```

Where "currData," "prevData" and "nextData" contain appropriate pixel data as shown below, and the subscripts indicate adjacent pixels. Notice that 96 (32×3) pixels are compared.

```
prevData;   /* Contains ORed pixels, P_−32,1 thru P_−1,1 | P_−32,0 thru P_−1,0 | P_−32,−1 thru  */
            P_−1,−1
currData;   /* Contains ORed pixels, P_0,1 thru P_31,1 | P_0,0 thru P_31,0 | P_0,−1 thru P_31,−1  */
prevData;   /* Contains ORed pixels, P_32,1 thru P_63,1 | P_32,0 thru P_63,0 | P_32,−1 thru P_63,−1  */
```

Lastly, eight bits of the variable "data" is outputted to the printer at a time. Unlike the preferred embodiment, 32 pixels are compared all at once in stead of 8 pixels. The following assignment statements in the C language is one implementation to output to the printer engine.

```
*ENGINE_FIFO_U = data>>24;   /* write the first 8 pixel data   */
*ENGINE_FIFO_U = data>>16;   /* write the second 8 pixel data  */
*ENGINE_FIFO_U = data>>8;    /* write the third 8 pixel data   */
*ENGINE_FIFO_U = data;       /* write the last 8 pixel data    */
```

Then, the determination is repeated for the next portion of the predetermined image.

According to yet another embodiment of the invention, the image enhancing coating may be applied as an aftercoat over the colorant material instead of underneath the colorant material as a precoat. Such an aftercoating is applied over the colorant material to effectively seal the deposited colorant. As one of the purposes of applying the precoating is to substantially smoothen the rough surface of the substrate, the aftercoating may be applied for the purpose of preventing the colorant material from dropping or otherwise becoming separated from the substrate. The aftercoating is, of course, preferably transparent, although it may contain colorant, usually to match the color of the substrate. In determining the extent to which the aftercoat will be applied for this embodiment, the same steps of determining the shadow mask area and the surround area as described above are applicable.

According to yet another embodiment of the invention, two image-enhancing layers of coating including a precoat and an aftercoat may be applied to sandwich a layer of colorant on the substrate. For this embodiment, one layer of precoat is applied to the surface of the substrate for the purpose of providing a more smooth colorant receiving surface. Then, after the colorant material is deposited over the precoat material, an additional layer of aftercoat is deposited at least over the area of the colorant. The aftercoat may cover only the shadow mask area, but not the surround area for the purpose of sealing the deposited colorant. The aftercoat material for the second layer application must be transparent so that the appearance of the colorant is not substantially affected by the film that is created by the precoat material. The shadow mask area and the surround area are again similarly determined by the above disclosed methods.

Figure 15:
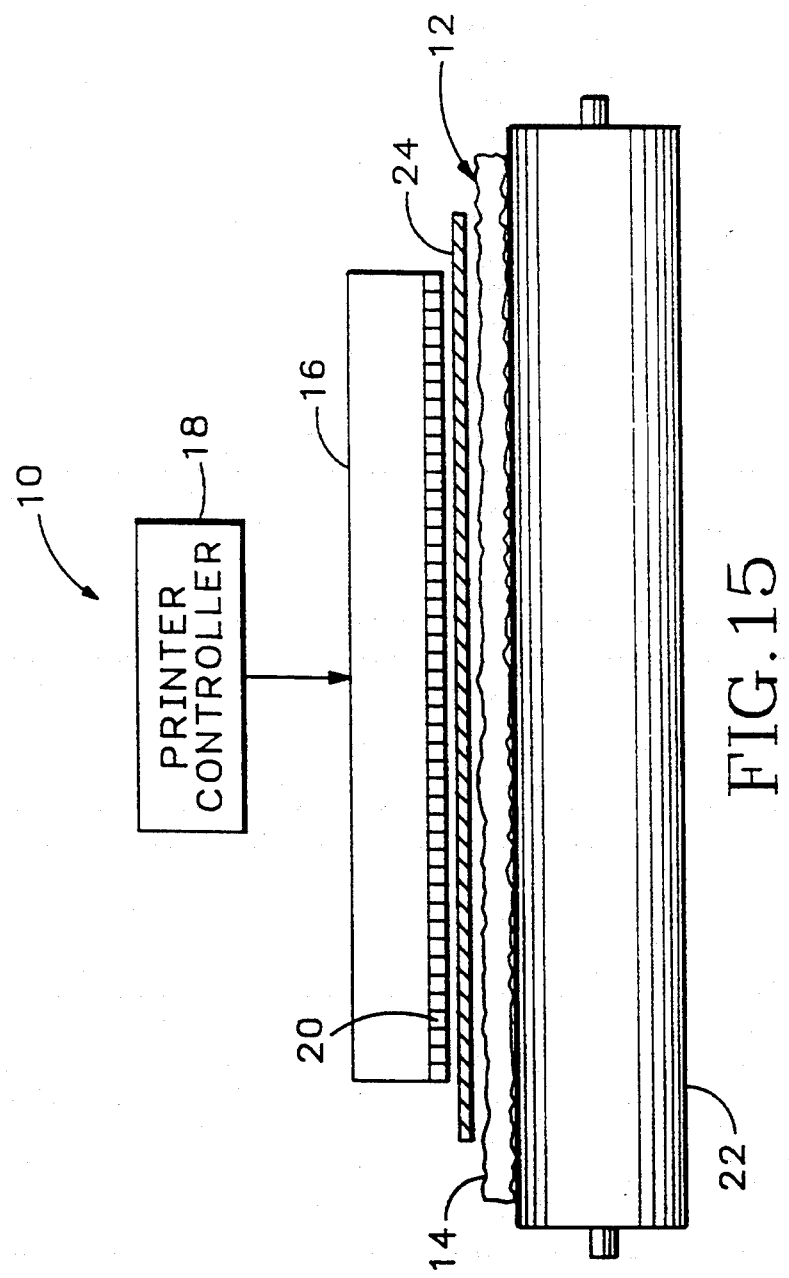
FIG. 15 is a schematic depiction of a thermal mass transfer printing system according to one embodiment of the invention.

FIG. 15 depicts a thermal transfer printing system 10 of the type which may be used to perform the methods which have been described in detail above. System 10 is constructed for thermal transfer printing on a substrate 12, which may have a rough surface 14. System 10 includes a printhead element 16, which is responsive to commands from a printer controller 18. Printhead 16, according to the preferred embodiment of the invention, includes a linear array of heating elements 20, each of which may be heated in response to a command from the printer controller 18 by electrical resistance. The activated heating elements 20 make contact with a ribbon 24 so as to heat colorant or coating or both. Ribbon 24 preferably includes a backing layer which is heat resistant and intended for contact with the print head elements, and a layer of colorant or precoat on the backing layer, depending on whether the ribbon 24 is for transferring precoat or colorant to the substrate. For precoat purposes, the precoat layer preferably includes a first separation sublayer which is formulated to easily and efficiently release from the backing layer when heated, and a second adhesive sublayer which is formulated to strongly adhere to the substrate. Sharp Electronics part number A4JX5RPT is such a multilayered ribbon. For colorant purposes, the colorant ribbon preferably does not contain such sublayers.

A support roller 22 or equivalent surface is provided to support substrate 12 in parallel spaced relationship with respect to the heating elements 20. Thus, the heated colorant or coating is deposited on the substrate surface 12. The increased tension in the ribbon 24 improves the departure of colorant and coating from the ribbon. By selectively controlling the heating elements 20 on printhead 16, printer controller 18 is constructed to control the placement of an image on to the substrate 12. Image creation is generally conducted in printer controller 18, using commercially available software specifically designed therefore, such as Adobe PostScript and the like. The printer assembly and system 10 may be one of several printers that are presently commercially available, such as the A4JX-560 printer which is manufactured by Sharp Electronics.

FIGS. 16, 17A and 17B diagrammatically show the differences between a single and multiple delivery of colorant and precoat on the substrate. In other words, according to another embodiment of the invention, the above described printing technology is modified so that at least a part of the same pixel on the substrate receives more than one layer of precoat or more than one layer of colorant, or both, for better adherence of the colorant to the substrate. In FIGS. 16, 17A and 17B, each pixel is rectangular, as is the case for certain types of print head hardware, most notably the A4JX-560 printer which is manufactured by Sharp Electronics.

FIG. 16 shows what may be termed a full-step mode of operation for the printing system. As may be seen in FIG. 16, a solid horizontal line may be formed by two vertically juxtaposed horizontal rows of pixels. In full-step mode, the horizontal line would be printed by applying precoat to the first row, shifting the substrate vertically by a full-step distance which is substantially equal to the vertical height of a pixel, then applying precoat to the second row. Colorant would then be applied on top of the precoat in identical fashion. In full-step mode, the each row of pixels receives only a single delivery of colorant and a single delivery of precoat.

FIGS. 17A and 17B depict an alternative operative mode of the invention, the half-step mode. The half-step mode utilizes hardware which permits the substrate to be vertically shifted, through finer control of roller 22 in FIG. 15, by a distance which is substantially half the distance between rows in the full-step process. This capability permits colorant and precoat alike to be applied in an overlapping relationship that enhances adherence of the colorant to the substrate. The A4JX-560 printer which is manufactured by Sharp Electronics is also the preferred hardware for the half-step mode.

Now referring to FIG. 18, the three rows of pixels depicted in FIG. 17B are enlarged and viewed from a different view point. A pixel in first row 30 is superimposed by another pixel in the second row 40 to partially overlap the first row pixel. In turn, the second row pixel is superimposed by yet another pixel in the third row 50 to partially overlap the second row pixel.

In the half-step mode, precoat is applied to the first horizontal row 30 of pixels, as is the case in the full-step mode. In FIG. 17A, the first horizontal row constitutes the light upper portion and the middle shaded portion of the illustrated row. After the first row of colorant has been applied, the substrate will be moved approximately half the pixel height in the vertical direction as shown in FIG. 17A. After this displacement, the printhead is located at a position where one half of the printhead element overlaps the first row 30 while the other half is vertically below the first row 30. At this point, a second horizontal line of precoat is applied to the substrate over the second row 40. The shaded area in FIG. 17A depicts the overlap between the two rows. The substrate is again vertically repositioned at this point by a distance which is again approximately equal to half the vertical distance of the full-step. A third row 30 of precoat is applied at this point. Comparing FIG. 16 with FIG. 17B, it will be seen that the half-step mode thus results in a replication of the image printed in the full-step mode. The principal advantage of the half-step mode is that the overlapping effect so created tends to improve adherence of the printed image to the substrate. Another advantage is that the amount of colorant or precoat which is placed on the substrate increases. This is because the pixel substrate receives multiple deliveries of colorant or precoat. The adherence of image-enhancing coating on colorant to the substrate is improved, and the drop out of either material from the substrate is reduced. As a result, an improved color appearance is achieved.

According to the invention, precoat may be applied in half-step mode while colorant is applied in full-step mode, or vice versa. The preferred embodiment, however, is for both precoat and colorant to be applied in half-step mode. In addition, the half-step mode could, within the scope of the invention, be used to apply an aftercoat in lieu of or in conjunction with a precoat.

It should be noted that the preferred printer hardware maintains a registration between the printer ribbon and the substrate during printing. As a result, the preferred printer hardware will not deposit overlapping full-thickness layers of precoat and/or colorant during the half-step mode of printing, because most of the precoat or colorant on the portion of the ribbon that overlies the overlap regions will already have been transferred to the substrate. The second pass over the areas of overlap is expected, though, to facilitate transfer of whatever precoat or colorant that was not transferred during the first pass. It is expected that the half-step mode will result in superior transfer of colorant or precoat to the substrate with such hardware. The half-step mode also has great utility in systems where the printer ribbon and substrate are not so registered.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of printing a predetermined image on to a substrate, comprising the steps of:
   (a) obtaining pixel data relating to whether a colorant is to be deposited in a predetermined area comprising at least one subject pixel and at least one adjacent pixel, said predetermined area rendering a portion of said image;
   (b) determining whether a colorant is specified for any of said predetermined area; and
   (c) depositing an image-enhancing coating over said subject pixel on said substrate if said step (b) determines that said colorant is so specified.

2. A method as recited in claim 1, wherein said pixel data includes information on a plurality of colors.

3. A method as recited in claim 2, wherein said colors include at least cyan, magenta, yellow and black.

4. A method as recited in claim 2, wherein said pixel data is arranged in rows and columns.

5. A method as recited in claim 4, wherein said step (b) further comprises the steps of:
   (i) determining if any of said pixel data on any of said rows specifies a colorant;
   (ii) determining if any of said pixel data on any of said columns specifies a colorant; and
   (iii) determining if said subject pixel will receive said image-enhancing coating based upon said steps (i) and (ii).

6. A method as recited in claim 2, wherein said colors are organized on a plurality of color planes 7. A method as recited in claim 1, wherein steps (a) through (c) are repeated for every portion of said predetermined image.

8. A method as recited in claim 1, wherein a next set of pixel data is obtained during step (a) while said determination in step (b) takes place for a current set of said pixel data.

9. A method as recited in claim 1, wherein said adjacent pixels surround said subject pixel.

10. A method as recited in claim 1, wherein said step (b) further comprises the steps of:
    (i) determining if any of said pixels which are arranged in one direction specifies a colorant; and
    (ii) determining if any of said pixels which are arranged in another direction specifies a colorant.

11. A method as recited in claim 10, further comprising the step of:
    (iii) determining an image-enhancing coating area based upon said steps (i) and (ii), said image-enhancing area including at least said subject pixel.

12. A method as recited in claim 1, further comprising the step of:
    (d) depositing a colorant over said image-enhancing coating on said subject pixel, said steps (c) and (d) being performed in no particular order.

13. A method of rendering a predetermined image on a substrate, comprising the steps of:
    (a) obtaining pixel data in a first format representing a plurality of color planes for a subject pixel and a predetermined number of surrounding pixels, said pixels being arranged in rows and columns, said pixels rendering a portion of said predetermined image;
    (b) determining if any of said row pixels specifies a colorant by ORing said row pixels;
    (c) determining if any column of said ORed pixels specifies a colorant by further ORing said ORed pixels; and
    (d) depositing an image-enhancing coating onto said subject pixel on said substrate based upon step (c).

14. A method as recited in claim 13, wherein said step (b) further comprising the step of:
    (i) converting said pixel data in said first format into a second data format, said second format being more compact than said first format.

15. A method as recited in claim 14, wherein said second data format is a printer input format.

16. A method as recited in claim 13, wherein steps (a) through (d) are repeated for every portion of said predetermined image, a next set of said pixel data being accessed during step (a) while steps (b) and (c) process a current set of said pixel data.

17. A system for printing a predetermined image on to a substrate, comprising:
    means for obtaining pixel data relating to whether a colorant is to be deposited in a predetermined area comprising at least one subject pixel and at least one adjacent pixel, said predetermined area rendering a portion of said image;
    first means for determining whether said colorant is specified in any of said predetermined area; and
    coating depositing means for depositing an image-enhancing coating over said subject pixel on said substrate if said first determining means determines that said colorant is so specified.

18. A system according to claim 17, wherein said pixel data includes information on a plurality of colors.

19. A system according to claim 18, wherein said colors include at least cyan, magenta, yellow and black.

20. A system according to claim 17, wherein said pixel data is arranged in rows and columns.

21. A system according to claim 20, wherein said first determining means further comprises:
second means for determining if any of said pixel data on said rows specifies a colorant;
third means for determining if any of said pixel data on said columns specifies a colorant; and
fourth means for determining if said subject pixel will receive said image-enhancing coating in response to said second and said third determining means.

22. A system according to claim 17, wherein said adjacent pixels surround said subject pixel 23. A system according to claim 17, wherein said first determining means further comprises:
second means for determining if any of said pixels arranged in one direction specifies a colorant; and
third means for determining if any of said pixels arranged in another direction specifies a colorant.

24. A system according to claim 17, wherein each of said pixel data includes information on a plurality of color planes.

25. A system according to claim 17, further comprising:
colorant depositing means for depositing a colorant on pixels according to said pixel data.

26. A system for printing a predetermined image on a substrate, comprising:
means for obtaining pixel data in a first format representing a plurality of colors for a subject pixel and a predetermined number of surrounding pixels, said pixels being arranged in rows and columns, said pixels rendering a portion of said predetermined image;
first means for determining if any of said row pixels specifies a colorant by ORing said row pixels;
second means for determining if any of said ORed pixels in columns specifies a colorant by ORing said ORed pixels; and
coating means for depositing an image-enhancing coating onto said subject pixel on said substrate in response to said first or second determining means.

27. A system according to claim 26, further comprising:
means for converting said pixel data into a second data format, said second format being more compact than said first data format.

28. A system for printing a predetermined image on a substrate, comprising:
a plurality of print head elements;
means for supporting said substrate relative to said print head elements;
a multilayered coating application ribbon positioned between said substrate and said print head elements, said multilayered ribbon comprising a backing layer, a separation layer adjacent to said backing layer which is formulated to separate from said backing layer when heated, and a adhesive layer which is formulated to adhere to said substrate; and
means for controlling said printhead elements, said controlling means being constructed and arranged to: (a) obtain pixel data relating to whether a colorant is to be deposited in a predetermined area comprising at least one subject pixel and at least one adjacent pixel, said predetermined area rendering a portion of said image; (b) determine whether a colorant is specified for any of said predetermined area; and (c) selectively activate said print head element to apply an image-enhancing coating over said subject pixel on said substrate if step (b) determines that said colorant is so specified.

29. A method of operating a thermal transfer printing apparatus comprising a plurality of heating elements adapted to be juxtaposed to a carrier comprising a colorant and an image-enhancing coating for printing on a substrate, the method comprising the following steps of:
(a) obtaining pixel data relating to whether a colorant is to be deposited in a predetermined area comprising at least one subject pixel and at least one adjacent pixel, said predetermined area rendering a portion of said image;
(b) determining whether a colorant is specified for any of said predetermined area;
(c) determining a heating element corresponding to the position of said subject pixel on the substrate; and
(d) energizing said heating element to deposit said image-enhancing coating on said substrate if step (b) determines that said colorant is so specified.

* * * * *